United States Patent
Pitteurs

(10) Patent No.: US 10,039,415 B2
(45) Date of Patent: Aug. 7, 2018

(54) COOKING APPARATUS AND METHOD FOR CONTROLLING A COOKING APPARATUS

(71) Applicant: Benny Marcelinus Lydie Pitteurs, De Panne (BE)

(72) Inventor: Benny Marcelinus Lydie Pitteurs, De Panne (BE)

( * ) Notice: Subject to any disclaimer, the term of this patent is extended or adjusted under 35 U.S.C. 154(b) by 0 days.

(21) Appl. No.: 14/395,406

(22) PCT Filed: Apr. 18, 2013

(86) PCT No.: PCT/BE2013/000019
§ 371 (c)(1),
(2) Date: Oct. 17, 2014

(87) PCT Pub. No.: WO2013/155574
PCT Pub. Date: Oct. 24, 2013

(65) Prior Publication Data
US 2015/0132450 A1 May 14, 2015

(30) Foreign Application Priority Data

Apr. 20, 2012 (BE) .................................. 2012/0263

(51) Int. Cl.
*A47J 37/06* (2006.01)
(52) U.S. Cl.
CPC ................................ *A47J 37/0611* (2013.01)
(58) Field of Classification Search
CPC ......................... A47J 37/0611; A47J 37/0676
USPC ........................... 99/372, 340, 378, 400, 446
See application file for complete search history.

(56) References Cited

U.S. PATENT DOCUMENTS

| | | | | |
|---|---|---|---|---|
| 2,571,891 A * | 10/1951 | Kassan | ............... | A47J 37/0611 99/373 |
| 2,985,094 A * | 5/1961 | Shaw | ............... | A47J 37/0611 99/331 |
| 3,281,577 A | 10/1966 | Altemiller | | |
| 3,632,962 A * | 1/1972 | Cherniak | ............. | A47J 37/0611 219/200 |
| 3,696,734 A * | 10/1972 | Beasley | ............... | A47J 37/0611 219/525 |
| 3,799,047 A * | 3/1974 | Freeman | ............. | A47J 37/0611 99/332 |

(Continued)

FOREIGN PATENT DOCUMENTS

DE 3021557 A1 1/1982
GB 2263764 A 8/1993

OTHER PUBLICATIONS

International Search Report and Written Opinion dated Jun. 13, 2013 (PCT/BE2013/000019); ISA/EP.

*Primary Examiner* — Dana Ross
*Assistant Examiner* — Lawrence Samuels
(74) *Attorney, Agent, or Firm* — Banner & Witcoff, Ltd.

(57) ABSTRACT

Cooking apparatus comprising at least one baking mould (11, 12) with a first (13) and a second (14) heating element; and a control system (16) configured to control the power supply to the first (13) and the second (14) heating element, wherein the control system (16) is configured to provide the first heating element (13) with a first electric power, while the second heating element (14) is provided with a second electric power which differs from the first electric power, wherein the first and the second electric power lie in a range from zero to a determined maximum electric power.

15 Claims, 4 Drawing Sheets

(56) References Cited

U.S. PATENT DOCUMENTS

| | | | | |
|---|---|---|---|---|
| 3,998,145 A * | 12/1976 | Maisch | A47J 37/0611 | 99/339 |
| 4,386,557 A * | 6/1983 | Meraj | A47J 37/0611 | 219/450.1 |
| 5,802,958 A * | 9/1998 | Hermansson | A47J 37/0611 | 99/349 |
| 6,125,740 A * | 10/2000 | Hedrington | A47J 37/0611 | 99/392 |
| 6,167,796 B1 * | 1/2001 | Wright | A47J 37/0611 | 99/332 |
| 6,257,126 B1 * | 7/2001 | Veljkovic | A47J 37/0611 | 99/349 |
| 6,389,959 B1 * | 5/2002 | Robertson | A47J 37/0611 | 219/386 |
| 6,401,601 B1 * | 6/2002 | Wu | A47J 37/0611 | 99/331 |
| 6,427,581 B1 * | 8/2002 | Wu | A47J 37/0611 | 99/331 |
| 7,082,941 B2 * | 8/2006 | Jones | A47J 27/62 | 126/39 H |
| 7,109,442 B2 * | 9/2006 | Steinberg | A47J 37/0611 | 219/386 |
| 7,960,673 B2 * | 6/2011 | Li | A47J 36/38 | 219/450.1 |
| 2002/0069764 A1 * | 6/2002 | Cohen | A47J 37/0611 | 99/331 |
| 2004/0020371 A1 * | 2/2004 | Patenotre | A47J 37/0611 | 99/331 |
| 2005/0000957 A1 * | 1/2005 | Jones | A47J 27/62 | 219/450.1 |
| 2005/0005777 A1 * | 1/2005 | Steinberg | A47J 37/0611 | 99/349 |
| 2005/0204927 A1 * | 9/2005 | Boyle | A47J 37/0857 | 99/389 |
| 2006/0049169 A1 * | 3/2006 | Li | A47J 37/0611 | 219/450.1 |
| 2006/0201333 A1 * | 9/2006 | Friel, Sr. | G05D 23/1951 | 99/372 |
| 2007/0095817 A1 * | 5/2007 | Gruaz | A47J 37/0611 | 219/486 |
| 2007/0277678 A1 * | 12/2007 | Mangano | A47J 37/0611 | 99/426 |
| 2008/0099461 A1 * | 5/2008 | Li | A47J 37/0623 | 219/402 |
| 2008/0223847 A1 * | 9/2008 | Kuo | A47J 37/0611 | 219/489 |

* cited by examiner

COOKING APPARATUS AND METHOD FOR CONTROLLING A COOKING APPARATUS

The application is a U.S. National Phase Entry of International Application No. PCT/BE2013/000019 filed Apr. 18, 2013, designating the United States of America and claiming priority to Belgium Patent Application No. 2012/0263 filed on Apr. 20, 2012. The present application claims priority to and the benefit of the above-identified applications and the above-identified applications are incorporated by reference herein in their entirety.

The present invention relates to a cooking apparatus, such as a waffle iron, a grilling apparatus or a pancake baking plate, comprising at least one baking mould, a first heating element and a second heating element. The invention further relates to a method for controlling such a cooking apparatus.

Waffle irons for baking various types of waffle, such as Brussels waffles or Liege waffles, are generally known and typically comprise an upper and a lower baking mould between which the waffles are baked. Known waffle irons typically have a simple on/off control which ensures that the heating elements arranged in the baking moulds are supplied with power when the appliance is turned on. DE 3021557 describes a waffle iron in which a control with two switches and a diode is provided, whereby it is possible to supply only half the maximum power to the heating elements. There are also control systems which make use of the temperature of the baking moulds and which control the power supply as a function thereof.

Known waffle irons have the drawback that the electric power available at for instance small waffle stalls is often limited, and that the available electric power is not utilized optimally. The present invention has for its object to propose a cooking apparatus which makes better use of the available electric power.

A first embodiment of a cooking apparatus according to the present invention comprises for this purpose at least one baking mould, a first heating element, a second heating element and a control system configured to control the power supply to the first and the second heating element. The control system is configured to provide a first power to the first heating element, while the second heating element is provided with a second power which differs from the first power. The first and the second power can lie in a range from zero to a determined maximum power. It is for instance possible to provide the first heating element with a first power equal to the determined maximum power, while the second element is not supplied with power, i.e. is provided with a power equal to zero. It is however also possible to provide the first heating element with a first power which is slightly lower than the determined maximum power, and to provide the second heating element with a power equal to the small remaining power.

A baking mould is typically manufactured from cast iron and has a great inertia. Taking account of this inertia, the invention makes it possible to achieve a better result even in the case a relatively low determined maximum power can be produced by the power supply, and to particularly achieve a more efficient and quicker heating of the at least one baking mould.

The cooking apparatus is for instance a waffle iron, a grilling apparatus or a pancake baking machine. In the case of a waffle iron, the appliance preferably comprises a first and a second baking mould, wherein the first heating element is intended to heat the first baking mould and the second heating element to heat the second baking mould. According to a possible embodiment, a grilling apparatus can in similar manner comprise a first grill baking mould and a second grill baking mould, wherein the first heating element is intended to heat the first grill baking mould and the second heating element to heat the second grill baking mould.

According to an advantageous embodiment, the control system is configured to supply the first and the second heating element alternately with the determined maximum power. The duration of the first period in which the first heating element is supplied with power can be equal to the duration of the second period in which the second heating element is supplied with power, but may also differ, particularly when two baking moulds are provided and it is desirable to bring one of the two baking moulds to a higher temperature than the other. The first heating element is thus supplied with power periodically during the first period and not supplied with power during the second period. The first period in which the first heating element is supplied with power can for instance lie between ten seconds and two minutes, preferably between twenty seconds and ninety seconds, and more preferably between forty seconds and sixty seconds. In similar manner the second period in which the second heating element is supplied with power can for instance lie between ten seconds and two minutes, preferably between twenty seconds and ninety seconds, and more preferably between forty seconds and sixty seconds. These periods can be further optimized for the best possible use of the available electric power.

According to an advantageous embodiment, each heating element comprises at least one electrical resistor. The control system can then be configured to provide current alternately to a first resistor of the first heating element and a second resistor of the second heating element.

According to a further developed embodiment, at least one temperature sensor is provided for measuring the temperature of the at least one baking mould. The control system can then be further configured to supply power to the first and the second heating element as a function of the temperature measured by the at least one temperature sensor. In the case of two baking moulds, two temperature sensors can for instance be provided and the power supply to the first heating element can for instance be stopped at the moment the first baking mould reaches a desired temperature, until the temperature drops below a determined value, after which the control system allows power to be supplied once again to the first heating element. The same applies for the second heating element.

According to a possible embodiment, each heating element is formed from a winding plate onto which a resistor is wound, this resistor being enclosed by a thermally conductive material which makes contact with a baking mould of the at least one baking mould.

According to another possible embodiment of a cooking apparatus according to the invention, a first baking mould is provided with two first heating elements and a second baking mould is provided with two second heating elements. The control system can then be configured to supply these four heating element with a different power, and particularly to supply these four heating elements alternately with a determined maximum power. In similar manner as described above, the heating elements can be embodied in the form of an electrical resistor and can for instance be wound onto a winding plate. Where there is one baking mould, it can be provided in similar manner with three or more heating elements, and the control system can be configured to supply these three or more heating elements with a different power, and particularly to supply these three or more heating elements alternately with a determined maximum power.

The invention will be further described on the basis of a number of by no means limitative exemplary embodiments of a cooking apparatus and a method for controlling a cooking apparatus according to the present invention, with reference to the accompanying drawings, in which.

Figure 1:
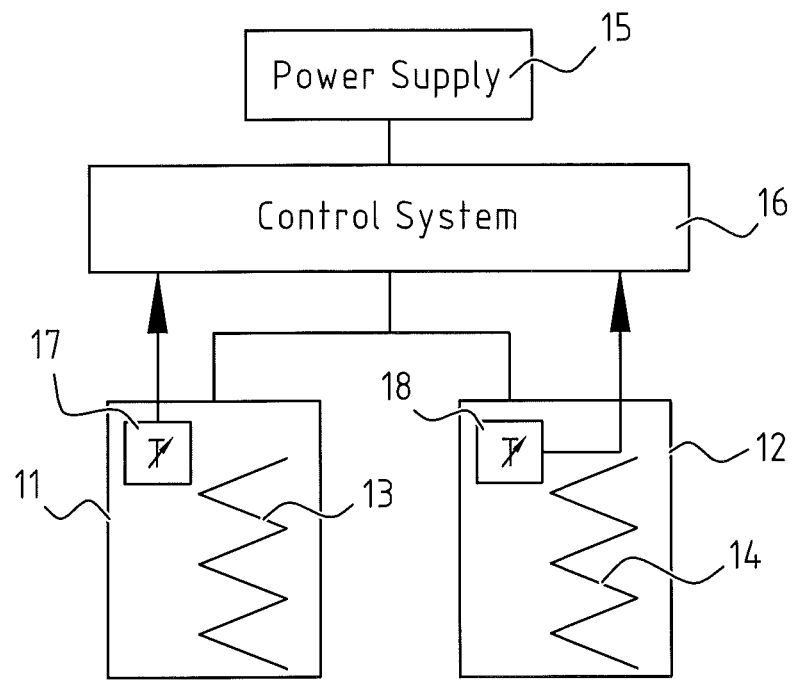
FIG. 1 is a block diagram illustrating a first embodiment of a waffle iron according to the invention.
Figure 2:
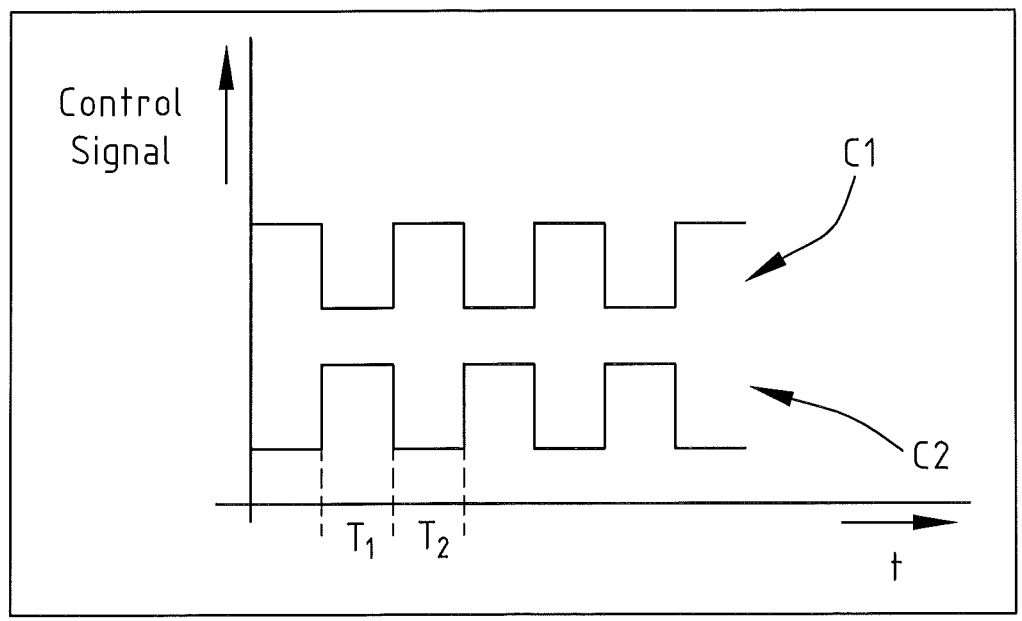
FIG. 2 is a graph illustrating control signals for use in the waffle iron of FIG. 1.

FIG. 1 illustrates schematically the operation of a first embodiment of a waffle iron according to the invention. The waffle iron comprises a first baking mould 11 with a first heating element 13 and a second baking mould 12 with a second heating element 14. Each baking mould 11, 12 is further provided with a temperature sensor 17, 18. Further provided is a power supply 15 for the purpose of supplying power to the first and second electric heating elements 13, 14. Power supply 15 is controlled by a control system 16. Control systems 16 is configured to provide first resistor 13 and second resistor 14 alternately with a determined maximum power that can be produced by power supply 15. This can for instance be realized by making use of the control signals illustrated in FIG. 2. A first control signal C1 is used to operate a switch which controls the power supply to first resistor 13. Current is supplied to first resistor 13 in a period T1. A second control signal C2 controls a switch for supplying current to second resistor 14. In period T1 the control signal is such that no current is supplied to second resistor 14. In a subsequent period T2 current is not supplied to first resistor 13 but is supplied to second resistor 14. The available power which can be produced by power supply 15 is in this way provided alternately to first resistor 13 and second resistor 14. The value of periods T1 and T2 can be optimized as a function of the type of waffle iron, and will typically depend on the shape and the weight of the baking moulds. The values of the periods T1 and T2 can for instance lie between forty and sixty seconds. T1 and T2 can be the same, but may also differ, for instance if it is desirable to bring the first baking mould 11 to a higher temperature than the second baking mould 12.

Control system 16 can further be configured to control the power supply to resistor 13, 14 as a function of the temperature measured by temperature sensors 17, 18.

Figure 3:
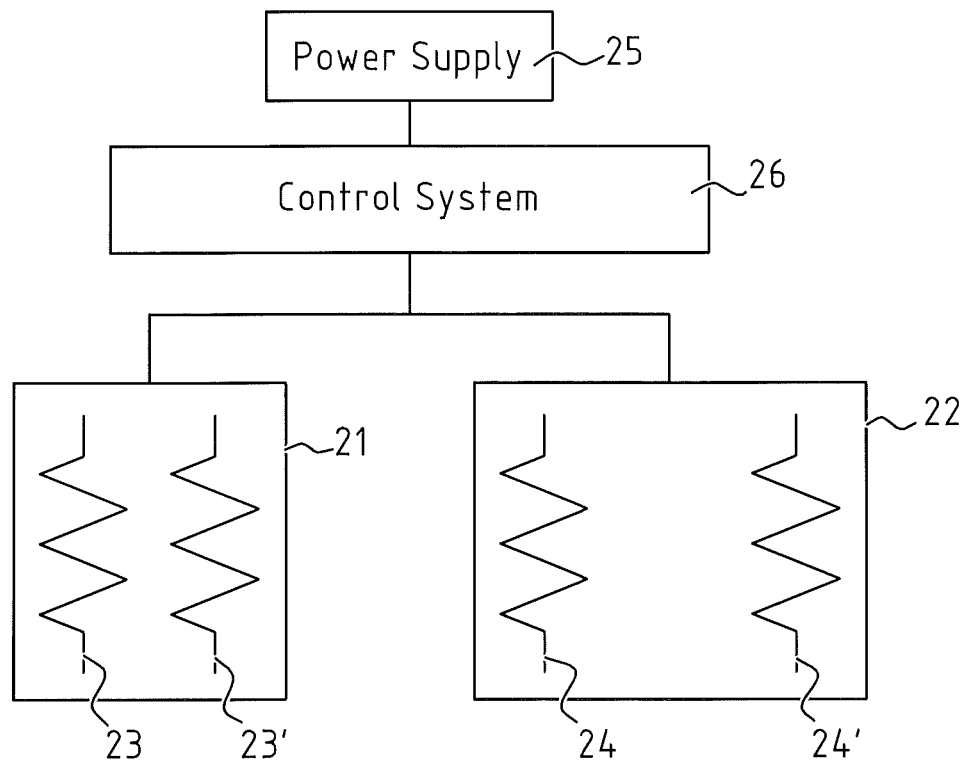
FIG. 3 is a block diagram illustrating a second embodiment of a waffle iron according to the invention.
Figure 4:
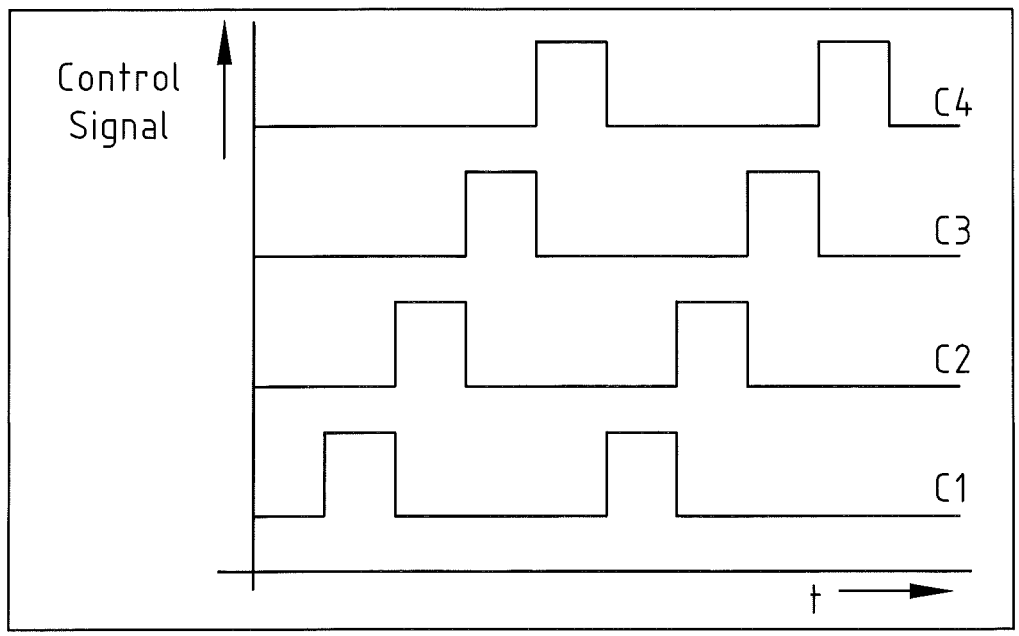
FIG. 4 is a graph illustrating control signals for use in the waffle iron of FIG. 3.

FIG. 3 illustrates a second alternative embodiment in which a first baking mould 21 is embodied with two first heating elements 23, 23' and a second baking mould 22 is embodied with two second heating elements 24, 24'. Such an embodiment may be advantageous particularly in the case of large waffle irons. Further provided is a power supply 25 for the purpose of supplying power to the heating elements. This power supply is controlled via a control system 26. Control system 26 can be configured to control the power supply to the respective resistors 23, 23', 24, 24' on the basis of control signals C1, C2, C3, C4, see FIG. 4. In the illustrated embodiment resistor 23 is supplied with power first, then resistor 23', followed by resistor 24 and finally resistor 24'.

The skilled person will appreciate that other sequences are also possible within the scope of the invention.

Figure 5:
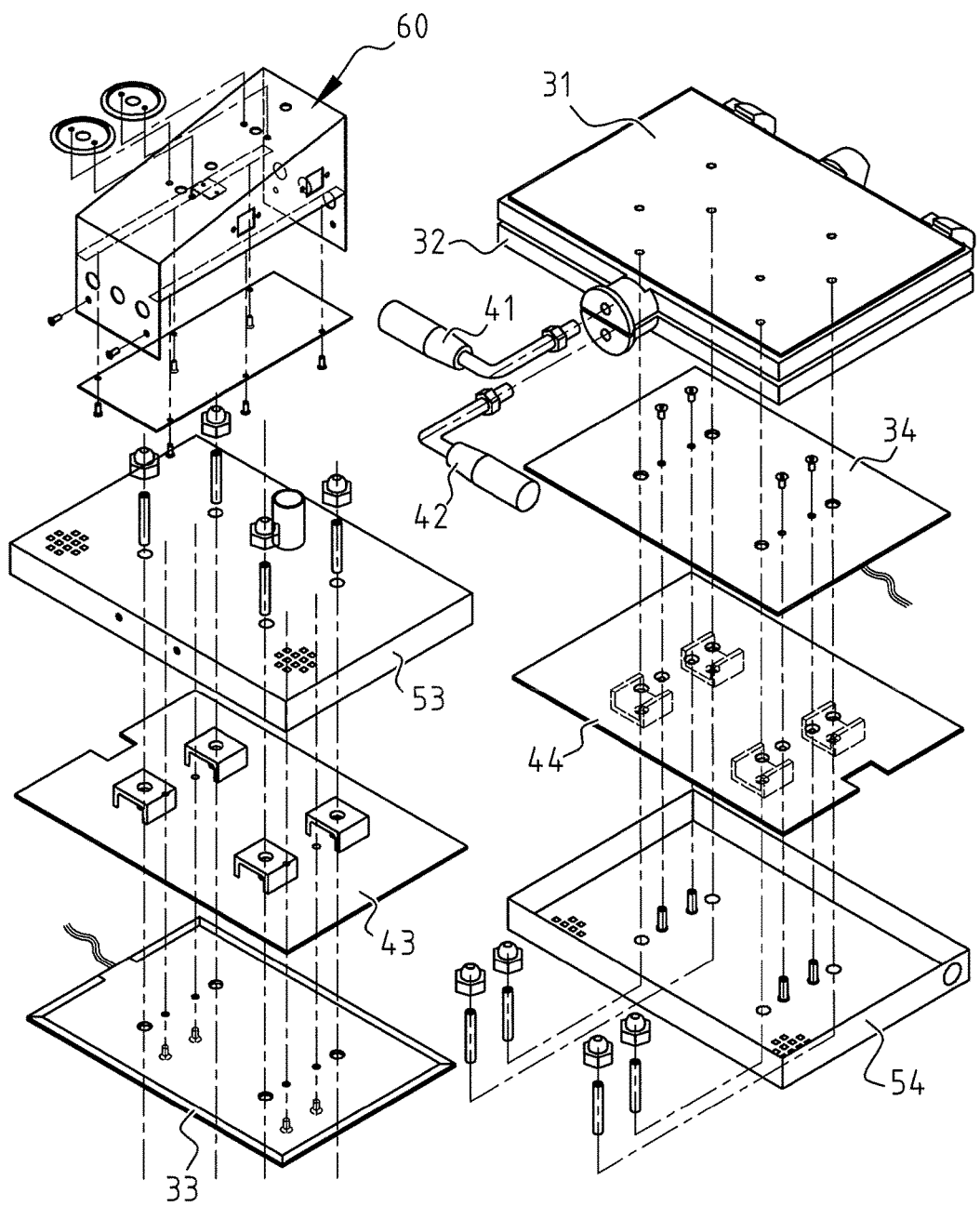
FIG. 5 is a schematic perspective view of a third embodiment of a waffle iron according to the invention.

FIG. 5 illustrates an embodiment of a waffle iron according to the invention. The waffle iron comprises a first baking mould 31 pivotally connected to a second baking mould 32. The first heating element 33 is pressed firmly against baking mould 31 using pressing plate 43. Heating plate 34 is pressed firmly against baking mould 32 in similar manner using pressing plate 44. Further provided are a first housing part 53 and a second housing part 54 which are mounted respectively around the first baking mould 31 with heating element 33 and pressing plate 43 and around the second baking mould 32 with associated heating plate 34 and pressing plate 44. An additional housing 60 is finally provided into which the control system can be incorporated.

Figure 6:
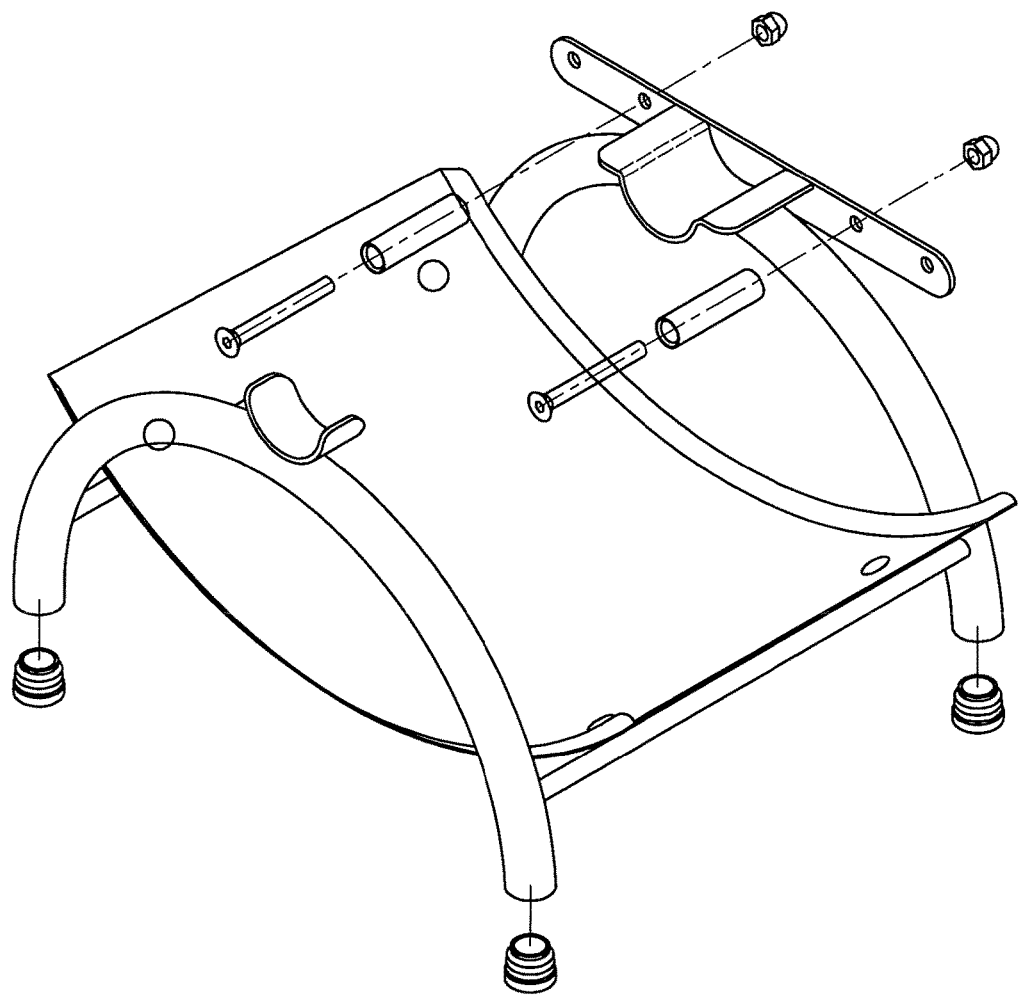
FIG. 6 is a schematic perspective view of a holder for a waffle iron according to the invention.

Finally, FIG. 6 illustrates an embodiment of a holder for the waffle iron of FIG. 5. Such a holder allows the waffle iron to be rotated in a convenient manner.

Although the figures illustrate the invention with reference to a waffle iron, the skilled person will appreciate that the description given can be easily adapted to describe a pancake baking plate or a grilling apparatus in which the invention is applied. In the case of a pancake baking plate only one round plate-like baking mould will be provided, which is heated by two or more heating elements.

The skilled person will appreciate that the present invention is not limited to the above described embodiments and that the scope of protection is defined solely by the following claims.

The invention claimed is:

1. Cooking apparatus comprising:
a first baking mould coupled to a first heating element, said first baking mould being manufactured from cast iron;
a second baking mould coupled to a second heating element, said second baking mould being manufactured from cast iron;
a control system configured to control a power supply to the first and the second heating element,
wherein said first baking mould is mounted movably relative to said second baking mould;
wherein the cooking apparatus is a waffle iron and wherein said first baking mould and said second baking mould are configured to bake a waffle between said first and second baking mould;
wherein said control system is configured to provide the first heating element with a first electric power, while the second heating element is provided with a second electric power which differs from the first electric power, wherein the first and the second electric power lie in a range from zero to a maximum electric power that can be produced by the power supply;
wherein the control system is configured to control during a first and second period the supply of the first and the second electric power alternately to the first heating element and the second heating element using control signals which are such that the first heating element is provided with the first electric power during the first period and with the second electric power during the second period, and that the second heating element is provided with the second electric power during the first period and with the first electric power during the second period, and the sum of the first and the second electric power is equal to the maximum electric power;
wherein said first period and said second period each are between 10 seconds and 120 seconds.

2. The cooking apparatus of claim 1, wherein the control system is configured to supply the first and the second heating element alternately with the maximum electric power.

3. The cooking apparatus of claim 1, wherein the first and the second heating element comprise respectively a first and a second resistor.

4. The cooking apparatus of claim 3, wherein the control system is configured to provide the first and the second resistor alternately with current.

5. The cooking apparatus of claim 1, wherein at least one temperature sensor is further provided for measuring the temperature of the at least one of the first and second baking mould.

6. The cooking apparatus of claim 5, wherein the control system is further configured to supply power to the first and the second heating element as a function of the temperature measured by the at least one temperature sensor.

7. The cooking apparatus of claim 1, wherein the first baking mould is pivotally connected along one side to the second baking mould.

8. The cooking apparatus of claim 1, wherein the first and the second heating element are formed respectively from a first and a second winding plate onto which a first and a second resistor is wound, wherein the first and the second resistor are attached via a thermally conductive material against the at least one baking mould.

9. The cooking apparatus of claim 1, wherein the first baking mould is provided with the first heating element and an additional first heating element, and the second baking mould is provided with the second heating element and an additional second heating element, and the control system is configured to supply the first heating element, the second heating element, the additional first heating element and the additional second heating element with a different electric power.

10. The cooking apparatus of claim 9, wherein the control system is configured to supply the first heating element, the second heating element, the additional first heating element and the additional second heating element alternately with the maximum electric power.

11. The cooking apparatus of claim 1, wherein the control system is configured to control the supply of power to the first heating element and the second heating element using control signals which are such that the first heating element is supplied with the maximum power periodically during the first period, and not supplied with power during the second period, and the second heating element is supplied with the maximum power periodically during the second period, and not supplied with power during the first period.

12. The cooking apparatus of claim 11, wherein the first period and the second period each are between 20 seconds and 90 seconds.

13. Cooking apparatus comprising:
a first baking mould coupled to a first heating element, said first baking mould being manufactured from cast iron;
a second baking mould coupled to a second heating element, said second baking mould being manufactured from cast iron;
system configured to control a power supply to the first and the second heating element;
wherein said first baking mould is mounted movably relative to said second baking mould;
wherein the cooking apparatus is a waffle iron and wherein said first baking mould and said second baking mould are configured to bake a waffle between said first and second baking mould;
wherein the first and the second heating element comprise respectively a first and a second resistor; and
wherein the first and the second heating element comprise respectively a first and a second resistor; and
wherein the control system is configured to provide the first and the second resistor alternately with a maximum current corresponding with a maximum electric power that can be produced by the power supply;
wherein the control system is configured to control during a first and second period the supply of the maximum current alternately to the first resistor and the second resistor using control signals which are such that the first resistor is provided with the maximum current during the first period, and not provided with current during the second period, and the second resistor is provided with the maximum current during the second period, and not provided with current during the first period;
wherein said first period and said second period each are between 10 seconds and 120 seconds.

14. The cooking apparatus of claim 13, further comprising a first and a second temperature sensor for measuring the temperature of the first and the second baking mould, respectively; and
wherein the control system is further configured to supply power to the first and the second heating element as a function of the temperature measured by the first and the second temperature sensor.

15. Cooking apparatus comprising:
a first baking mould coupled to a first heating element, said first baking mould being manufactured from cast iron;
a second baking mould coupled to a second heating element, said second baking mould being manufactured from cast iron; and
a control system configured to control a power supply to the first and the second heating element;
wherein said first baking mould is mounted movably relative to said second baking mould;
wherein the cooking apparatus is a waffle iron and wherein said first baking mould and said second baking mould are configured to bake a waffle between said first and second baking mould;
wherein the control system is configured to supply the first and the second heating element alternately with a maximum electric power that can be produced by the power supply;
wherein the control system is configured to control during a first and second period the supply of maximum electric power alternately to the first heating element and the second heating element using control signals which are such that the first heating element is supplied with the maximum electric power during the first period, and not supplied with power during the second period, and the second heating element is supplied with the maximum electric power periodically during the second period, and not supplied with power during the first period.

* * * * *